United States Patent [19]

Sing

[11] Patent Number: 4,866,255
[45] Date of Patent: Sep. 12, 1989

[54] APPARATUS FOR ARTICLE STORAGE, RETRIEVAL AND INVENTORY

[76] Inventor: Peter Sing, 168-10 84th Ave., Jamaica Hills, N.Y. 11432

[21] Appl. No.: 875,229

[22] Filed: Jun. 17, 1986

[51] Int. Cl.$^4$ .................. G06F 15/24; G06K 7/00
[52] U.S. Cl. .................................. 235/385; 235/383; 364/403; 364/567; 177/147
[58] Field of Search .................. 340/825.35; 235/375, 235/385, 381, 383, 376, 462; 177/25.17, 147, 145, 163; 364/400–403, 567, 466, 478, 479; 312/184

[56] References Cited

U.S. PATENT DOCUMENTS

| | | | |
|---|---|---|---|
| 3,716,697 | 2/1973 | Weir | 235/383 |
| 4,108,363 | 8/1978 | Susumu | 235/383 |
| 4,262,810 | 4/1981 | Ilich | 312/184 |
| 4,400,107 | 8/1983 | Pitts | 312/184 |
| 4,419,734 | 12/1983 | Wolfson et al. | 364/567 |
| 4,426,006 | 1/1984 | Horii et al. | 177/145 |
| 4,455,880 | 6/1984 | Naslund | 177/147 |
| 4,529,092 | 7/1985 | Swingley | 312/184 |
| 4,563,736 | 1/1986 | Gerpheide et al. | 235/462 |
| 4,657,095 | 4/1987 | Hardin et al. | 177/147 |
| 4,704,517 | 11/1987 | Campisi et al. | 235/375 |

Primary Examiner—Alan Faber
Assistant Examiner—Robert A. Weinhardt
Attorney, Agent, or Firm—Nathaniel Altman

[57] ABSTRACT

A plurality of flexible expandable containers for storing articles of any shape is provided, each having an attachment portion for suspending the containers from two parallelly spaced horizontal members of a supporting frame. Suspended adjacent containers may be varied in length to save space so that more containers may be accommodated on each frame, and frames may be mounted in storage or file cabinet drawers. Mechanisms are provided for opening and closing storage drawers selectively; for lifting one or more containers at a time either selectively or progressively; for weighing each group of lifted containers at once but individually and separately; for calculating the number of alike articles stored in each container from the gross weight measured and the container tare weight previously obtained; and for processing, storing and delivering or displaying the inventory information thus acquired.

31 Claims, 4 Drawing Sheets

APPARATUS FOR ARTICLE STORAGE, RETRIEVAL AND INVENTORY

This invention relates to systems for storing articles and taking inventory. More particularly, it relates to systems especially suited for storing and taking inventory of relatively small articles such as mechanical or electronic components used in relatively small machines or to assemble electronic systems or those articles that constitute the inventory of a business selling relatively small articles, such as may be used in the jewelry industry.

Conventional storage systems generally consist of a series of boxes stacked one upon the other in columns and rows in drawers. Taking inventory of the articles stored is a labor-intensive, time-consuming process. The boxes must be removed from the drawers, opened, the contents counted, and the procedure reversed, for each drawer.

Another storage system for small parts consists of a housing containing rows and columns of small plastic drawers which slide into and out of the housing. While somewhat better than the box and drawer storage system mentioned above, this system is fairly expensive, and limited in its application to parts which are of fairly regular shape, such as small electronic components. Irregularly shaped parts tend not to fill a drawer and because the drawers are rigid, space is wasted in that only a small number of such irregularly shaped parts may be stored in a drawer. Further, to determine remaining inventory, it is still necessary to slide each drawer out, count the number of parts therein, and slide the drawer back in.

It is therefore a principal object of the present invention to provide a storage system for small mechanical and/or electronic components.

It is another object of the invention to provide a storage system for efficiently storing objects which are of irregular shape.

It is a further object of the invention to provide a storage system which permits a rapid determination of remaining inventory.

It is another object of the invention to automatically provide a permanent inventory record.

It is still another object of the invention to provide a storage system which can be placed within a file cabinet drawer.

It is yet another object of the invention to provide a storage system which can be used for efficiently storing a variety of components of different sizes and shapes.

It is still another object of the invention to provide an output advising an inventory manager that it is necessary to order additional quantities of particular articles when the number of said articles in inventory is below a predetermined number.

SUMMARY OF THE INVENTION

In accordance with the invention, a storage system includes a frame with two parallel, spaced apart frame members. A series of article storage means each have a support means affixed thereto for supporting the article storage means on the frame members. The support means may extend between the frame members. The article storage means are flexible so as to expand in a direction parallel to the frame members at any portion thereof to receive articles of arbitrary shape.

The storage means may be formed of a flexible, transparent material and may be dimensioned so as to have different lengths in a direction extending downward from the upper frame members.

The frame may contain further members, which together with the two the parallel members, define a solid rectangle. The further members may be dimensioned and positioned to permit viewing of the article storage means in a direction parallel to that of the support means.

The invention also contemplates that the frame is received within a file cabinet drawer having sides con figured to permit viewing of the article storage means, in a direction parallel to the support means.

In accordance with another aspect of the invention, the storage system also includes a lifting means disposed adjacent the members of the frame. At least one attachment means is coupled to the lifting means to engage a part of the article storage means. A motive means moves the lifting means so that each of the attachment means engages the part of one article storage means. A weighing means associated with each attachment means weighs the article storage means to determine the gross weight thereof.

A calculating means is provided to determine the number of articles stored in each article storage means weighed. The calculating means includes storage means for storing values corresponding to net weight of each article storage means and weight of one of the articles stored therein.

Each article storage means includes an information coding means for storing information concerning at least the nature of the articles stored in the article storage means. Decoding means are coupled to the lifting means so as to acquire and decode the information.

According to yet another aspect of the invention, a series of storage drawers are arranged in proximity to one another. A frame and its associated article storage means are disposed in each drawer. Actuating means selectively cause each of the drawers to be extended from its respective position in the direction of its length.

The system according to the invention also includes a second frame extending so as to have a frame portion thereof aligned with each of the drawers. A track extends to each of the frame portions. A lifting means is coupled to the frame and movable on the track. At least one attachment means is coupled to the lifting means to engage a part of one of the article storage means. A motive means moves the lifting means along the track so that each attachment means is positioned to engage the part of one of the article storage means. A directing means, such as a programmed computer, directs the motive means to move the lifting means along the track successive to positions adjacent the drawers, when the drawers have been extended, and causes the lifting means to move so that the attachment means engage the article storage means individually and lift each article storage means so as to be supported only by the corresponding attachment means.

A weighing means is associated with each attachment means to determine gross weight of the article storage means.

BRIEF DESCRIPTION OF THE DRAWINGS

In, order that the invention may be readily carried into effect, it will now be described with reference to the accompanying drawings, wherein.

DETAILED DESCRIPTION OF THE PREFERRED EMBODIMENTS

The present invention is directed both to a simple storage system which may be manually operated and to more sophisticated systems that operate automatically, using a computer for motive and inventory control. While the present invention is intended primarily for use in storage and inventory control of small articles, it is applicable with suitable modifications, to storage and inventory control of larger articles.

Figure 1:
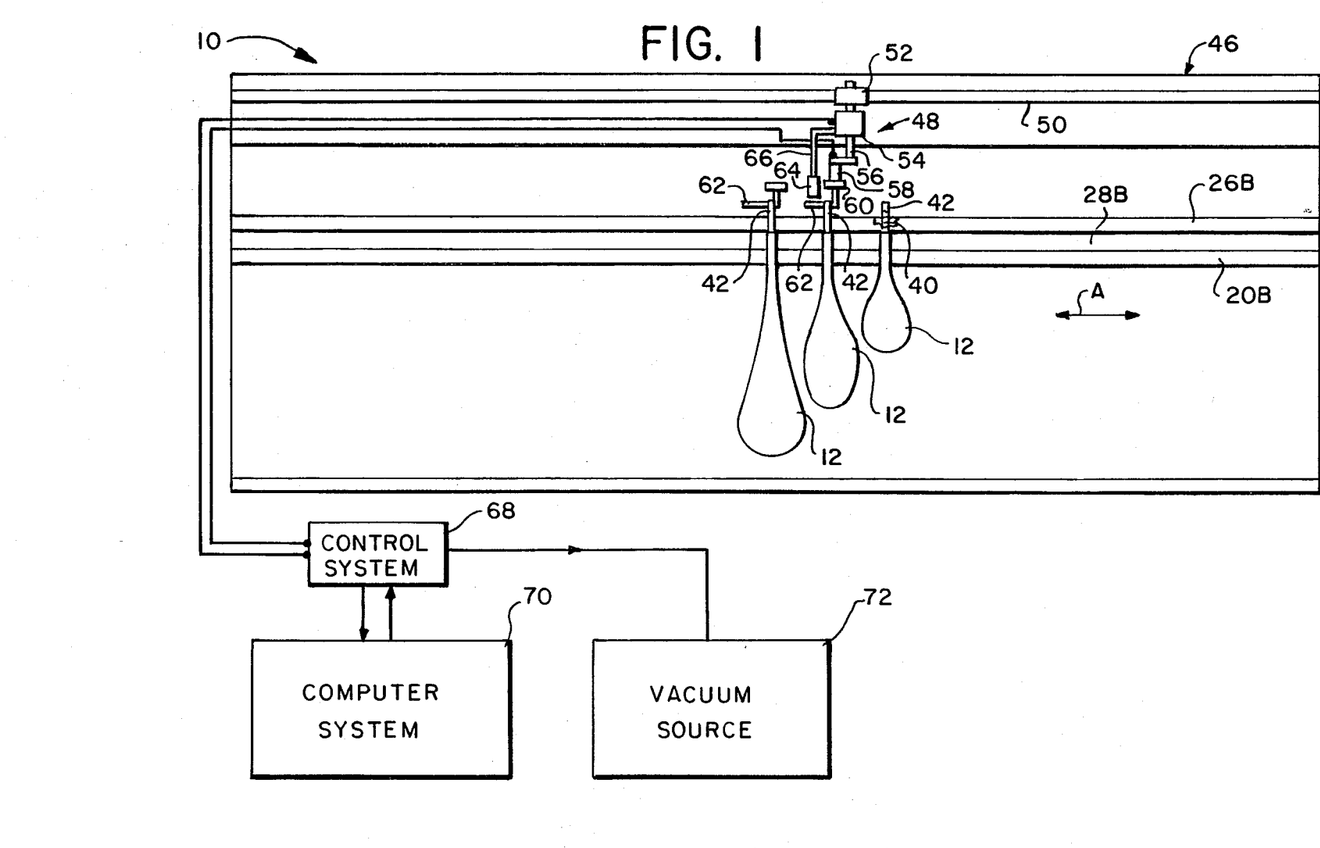
FIG. 1 is a side elevational view of a storage system according to the invention showing the control elements thereof in block form.

Referring to FIG. 1, a simple storage system according to the invention includes a frame 10, and a series of article storage containers 12.

Figure 2:
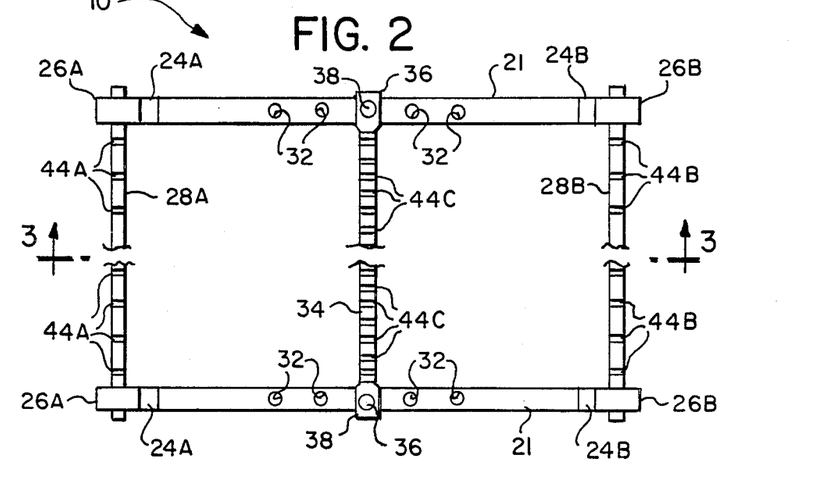
FIG. 2 is a plan view of the frame of FIG. 1.
Figure 3:
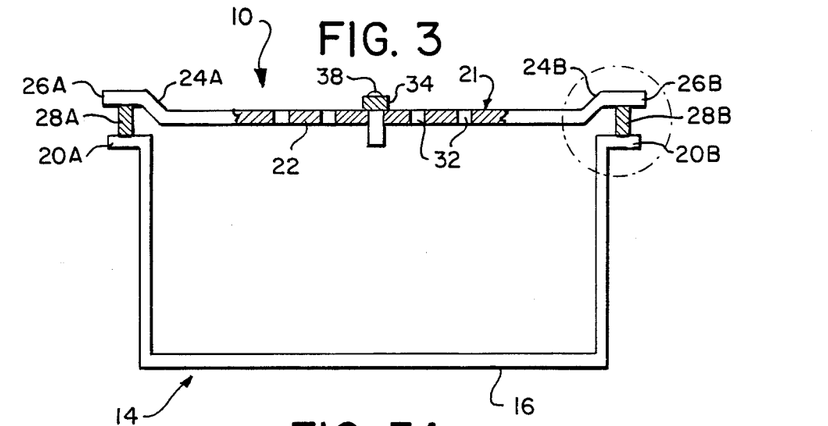
FIG. 3 is a cross sectional view taken along line 3—3 of FIG. 2.
Figure 3A:
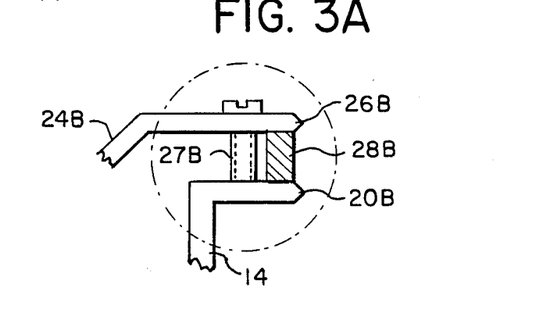
FIG. 3A is an enlarged view of a portion of FIG. 3.

Referring also to FIG. 2, FIG. 3 and FIG. 3A, frame 10 includes at each end thereof a generally U-shaped rod or bar member 14 having a bottom portion 16 and two vertical portions 18A and 18B extending from bottom portion 16 in a direction perpendicular to the longitudinal axis thereof. Vertical portions 18A and 18B each have a respective flange 20A and 20B extending therefrom in a direction parallel to bottom portion 16.

Two transverse members 21 having a rectangular cross section are each shaped so as to have a central portion 22, diagonally extending portions 24A and 24B at the ends of portion 22, and a flange 26A and 26B extending from diagonal portions 24A and 24B respectively. Screws 27A and 27B extend through openings (not shown) in flanges 26A and 26B respectively into tapped holes (not shown) in flanges 20A and 20B respectively. As is apparent from FIG. 3A, screws 27A and 27B are sufficiently long to allow small portions of longitudinal bar members 28A and 28B to be captured between flanges 20A and 26A and 20B and 26B, respectively, when screws 27A and 27B are tightened to secure transverse members 21 to respective members 14.

Each transverse member 21 has a series of tapped holes 32 along its length. An intermediate member 34 of rectangular or circular cross section having at each end thereof a flange 36 may also be provided. Screws 38 extend through holes (not shown) in flanges 36 and are received in holes 32, thus securing central member 34 to transverse members 21. The position at which intermediate member 34 is secured along transverse members 21 can be varied by selecting a different pair of holes 32 for receiving screws 38.

Referring again to FIG. 1, and assuming that intermediate member 34 is not present, the series of article containers 12 is supported in frame 10 by means of support tabs 42 affixed at each end of stiff upper member. 40 affixed to or integrally formed as a part of containers 12 and extending parallel to transverse member 21 between longitudinal members 28A and 28B. Tabs 42 engage longitudinal members 28A and 28B. Tabs 42 may be similar to those used on file folders, in that tabs 42 loop over longitudinal members 28A and 28B, but are open at the bottom to permit containers 12 to be removed from frame 10 by upward motion.

Intermediate member 34 is used, then stiff upper member 40 of article containers 12 will be of a smaller dimension in the direction extending perpendicular to the page in FIG. 1. Tabs 42 will support a first series of containers 12 between longitudinal member 28A and intermediate member 34 and a second series of containers 12 between intermediate member 34 and longitudinal member 28B. If intermediate member 34 is secured at the center of transverse members 21, then the length of members 40 of the containers 12 in both series will be equal. However, intermediate member 34 can be secured at positions displaced from the center. In that event, the first series of containers and the second series of containers will be of different lengths.

It is also possible for more than one intermediate member 34 to be used. One member 34 is positioned between holes 32 at the extreme left of these shown in FIG. 2, while the other is at the holes 32 to the extreme right. Three series of article containers 12 of appropriate length may then be supported between longitudinal members 28A and 28B; a first between member 28A and the first intermediate member ; a second between the two intermediate members, and a third between the second intermediate member and longitudinal member 28B.

Longitudinal members 28A and 28B are preferably configured with a series of respective recesses 44A and 44B in the upper surfaces thereof. Recesses 44A and 44B are regularly spaced and positioned with respect to one another so that when tabs 42 are received therein, containers 12 are parallel to transverse members 21 and regularly spaced therebetween. If intermediate member 34 is present, it is preferably configured with recesses 44C regularly spaced at intervals along its upper surface equal to one half the spacing between recesses 44A and recesses 44B. Then there may be two series of containers 12, with recesses 44A, 44B and 44C arranged so that, with respect to FIG. 2, the right tabs 42 of the first set of containers alternate with the left tabs 42 of the second set of containers along intermediate member 34, and recesses 44A and 44B along the upper surface of longitudinal members 28A and 28B, respectively, are regularly spaced from one another but recesses 44A along the upper surface of longitudinal member 28A are displaced by one half of said regular spacing from recesses 44B in the upper surface of longitudinal member 28B. Thus, all containers 12 extend in a direction parallel to transverse members 21, but containers to the left of intermediate member 34 alternate with containers to the right of intermediate member 34 as considered with respect to position along member 34 between transverse members 21.

With reference to FIG. 1, containers 12 are preferably made of a flexible material which expands in the directions shown by arrow A (the direction parallel to longitudinal members 28A and 28B) at substantially any portion or position thereof. Thus containers 12 can receive and surround articles of arbitrary shape without wasting space, as would be the case for a rigid container. In other words containers 12 are constructed as bags or pouches which can expand or alter shape as additional components are placed therein. As is also apparent from FIG. 1, containers 12 extend for different lengths from the plane defined by longitudinal members 28A and 28B. When articles are placed in containers 12, there is a tendency for the containers to expand most at the bottom due to the effects of gravity. If containers 12 are of different lengths, the expansion at the bottom of a first container will not physically interfere with the expansion at the bottom of a second container and there will be relatively efficient utilization of space.

In a manually operated system according to the invention, it is preferable that the material used to construct containers 12 be transparent. Simple manual lifting of the container 12 from frame 10 will then permit a relatively rapid visual count of parts therein, or at least a relatively rapid rough estimate. In addition, it is preferable that frame 10 be constructed so as to permit viewing of containers 12 from the side, that is in a direction parallel to transverse members 21. To permit such viewing frame 10 may be of substantially open construction, as shown. or if not of open construction, may be formed of a transparent material. In either case, viewing from the side will permit a rapid visual inspection of how full each container 12 is at the time. Containers 12 which do not bulge much in the direction of arrow A may then be manually lifted from frame 10 to obtain a more precise count of the number of articles contained therein.

Frame 10 may be free standing or may be sized and shaped to fit within a file cabinet drawer, as more fully described below. In either event frame 10 and its associated containers 12 constitute a simple, manually operated storage system which meets many of the above mentioned objects. However, this simple system may be automated.

To accomplish automation, an additional structure 46 is mounted adjacent to or over frame 10. Structure 46 has a lifting mechanism 48 mounted on a rail or track 50 so that mechanism 48 can move in a direction parallel to longitudinal members 28A and 28B above containers 12. If there are two rows of containers 12, track 50 may have a "U" shape to allow lifting mechanism 48 to move over the first series of containers 12, move in a direction parallel to transverse member 21 so as to be over the second series of containers 12, and then parallel to longitudinal members 28A and 28B over the second series of containers 12. If two intermediate members 34 are used, track 50 may be "S" shaped to allow motion of mechanism 48 over three series of containers 12. Alternatively, more than one rail 10, each with a separate lifting mechanism 40 may be provided for each series of containers. In any case, each lifting mechanism 48 includes a motor 52 or other suitable means for causing lifting mechanism 48 to move along track 50.

Lifting mechanism 48 includes, coupled thereto, a weight transducer 54 suitable for determining the weight of any object connected to a bar 56 depending therefrom. An attachment mechanism 58 is coupled to bar 56. Attachment mechanism 58 may be an electromagnet which attracts a magnetic member 60 affixed to each of containers 12. When attachment mechanism 58 is aligned with member 60 due to motion of mechanism 48, and attachment mechanism 58 is actuated, one container 12 is lifted so that its tabs 42 are free and clear of longitudinal members 28A and 28B of frame 10. Thus, only attachment mechanism 58 supports the entire weight of containers 12 and the articles stored therein.

Attachment mechanism 58 may instead contain, at its lower edge, a vacuum cup, and member 60 need only have a flat surface which can form a vacuum seal when engaged by the vacuum cup of mechanism 58.

It will be understood that to reduce the gap over which attachment mechanism 58 must operate to attract member 60, a second motor (not shown) may be provided to lower lifting mechanism 48 when attachment mechanism 58 is directly over member 60 and to lift mechanism 48 so that weight transducer 54 makes weight measurement of each container 12. It will also be understood that the weight of bar 56 and attachment mechanism 58 will be "zeroed" out in weight transducer 54 or in later processing.

Containers 12 may also have, extending along on upper surface thereof, a strip 62 for encoding data magnetically or optically. Data may be encoded optically, for example, by using a code similar to the uniform price code found on many products sold in supermarkets. Whether the data is magnetically or optically recorded, an appropriate data decoding device 64 such as a coil or and optical reader which emits light of a given frequency and has a receiver for receiving light reflected from strip 62 of that frequency, is provided. Decoding device 64 is supported by a bar 66 coupled to an exterior surface of transducer 54 so that it moves over strip 62 to receive the data encoded therein.

Strip 62 may contain information concerning at least one of the type of article stored in container 12 to which it is attached, the weight of said article and the net weight of container 12.

Motor 52, weight transducer 54, decoding device 64 and attachment device 58 are all connected to a control system 68 which interfaces with a computer system 70. If attachment device 58 is a vacuum system, a vacuum source 72 such as a mechanical vacuum pump is provided and control system 68 contains electrically operated vacuum valves to control the vacuum applied to attachment device 58.

Thus, computer 70, through control system 68, operates lifting mechanism 48, including attachment device 56, to successively lift containers 12 to perform a weighing operation and to read data from strips 62. Data from decoding device 64 is fed to computer 70 through control system 68. The computer subtracts from the measured gross weight of each container 12, its net weight which may be a number stored in the memory of computer 70 or may be data obtained from strip 62. If articles of a single type are stored in container 12, then computer 70 divides the weight of the articles by another number stored therein or encoded on strip 62 equal to the weight of a single article. The total number of articles in container 12 is thereby determined.

At regular intervals of time, computer 70 may be activated to cause control system 68 to operate the system according to the invention to take inventory. Further, computer 70 may provide a print out, on a suitable printer (not shown) connected thereto of the number of articles in each container 12. This information is obtained automatically, without the use of any significant amount of labor. A manager may advantageously use this information for inventory control or for accounting purposes. Further, the computer may be programmed to inform the manager as to which items are in short supply and therefore must be re-ordered or additional items manufactured. The computer program may take into account such factors and lead time, minimum/maximum quantity, and optimal purchase formulas to provide information as to when to order an item, and how many should be ordered.

Figure 4:
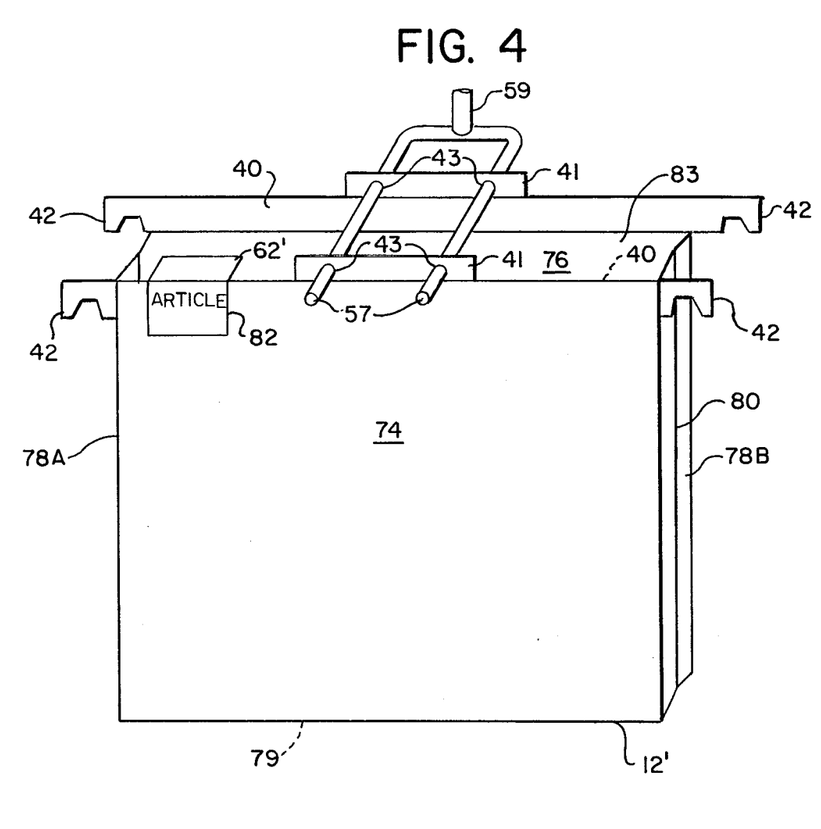
FIG. 4 is a perspective view an alternate embodiment of an article storage container for use in the system of FIG. 1.

Referring to FIG. 4, an article container 12' has a front 74, a back 76, sides 78A and 78B and a bottom 79. Front 74 and rear 76 may be relatively flexible members of the type used in conventional file folders. Sides 78A and 78B and bottom 79 have folds 80 and 81 (FIG. 5), respectively, permitting container 12' to expand or contract in thickness between front 74 and back 76 as required to accommodate articles stored therein.

Container 12' has a rectangular opening 83 only at the top thereof defined by sides 78A and 78B, front 74 and back 76.

A stiff upper member 40 is affixed to the top of front 74 and back 76. A tab 42 is integrally formed with, or affixed to each end of, each member 40. A rectangular vertical extension 41 is integrally formed, or affixed to, the center of each member 40 and extends upwardly therefrom. Each extension 41 has a pair of holes 43 disposed and sized to receive horizontally extending rods 57 of an attachment member 59 which is used with attachment mechanism 58 instead of an electromagnet or a vacuum cup. The proper series of motions of lifting mechanism 48 will cause rods 57 to engage extensions 41 through holes 43, to lift container 12' so that tabs 42 are free of longitudinal members 28A and 28B of frame 10 and container 12' is supported solely by attachment member 59 in order for weighing tranducers 54 to provide an output signal indicative of the weight of container 12'. Further motion of lifting mechanism 48 will cause container 12' to be lowered so that tabs 42 are again supported by longitudinal member 28A and 28B and rods 57 are withdrawn from holes 43, freeing attachment member 59 for use in lifting a successive container 12'.

Each container 12' has affixed to front 74 a strip 82 with a surface suitable for receiving ink or type so that it can be marked with information readable by the user of the system indicating the nature of the articles stored therein, or other information of the type stored on strip 62 of FIG. 1. Strip 82 may have a portion which forms a strip 62', bent with respect to strip 82, so as to be parallel to or be disposed in the plane defined by the upper edges of members 40. Strip 62' may be of one of the type discussed above with respect to strip 62 of FIG. 1 so that the information contained thereon may be read by decoding device 64.

Containers 12' may be integrally molded from a plastic material with members 40, extensions 41 and tabs 42 integrally molded therein.

Figure 5:
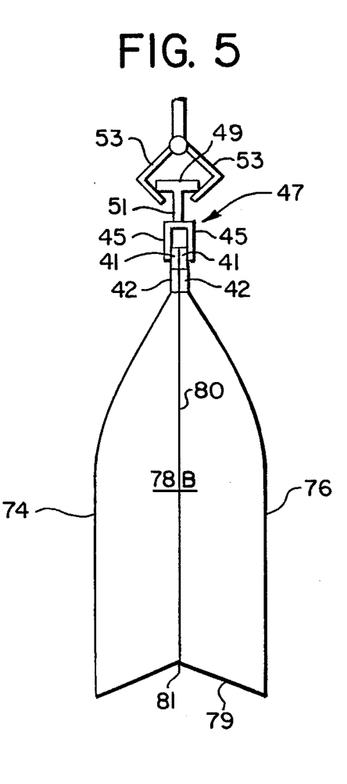
FIG. 5 is a side elevation view of the container of FIG. 4 used with a clip in accordance with the invention.

Referring to FIG. 5, it may be advantageous to capture extensions 41 of container 12' between the holding members 45 of a clip 47 which serves to securely grip extensions 41 to hold container 12' closed and permit lifting thereof by means of a horizontal member 49 affixed to a vertical member 51 extending from clip 47 and which may be integrally formed therewith. Attachment means 58 (FIG. 1) may be equipped with a set of motor operated jaws or fingers 53 (or a vacuum cup) to grip horizontal member 49 for lifting and weighing.

Figure 6:
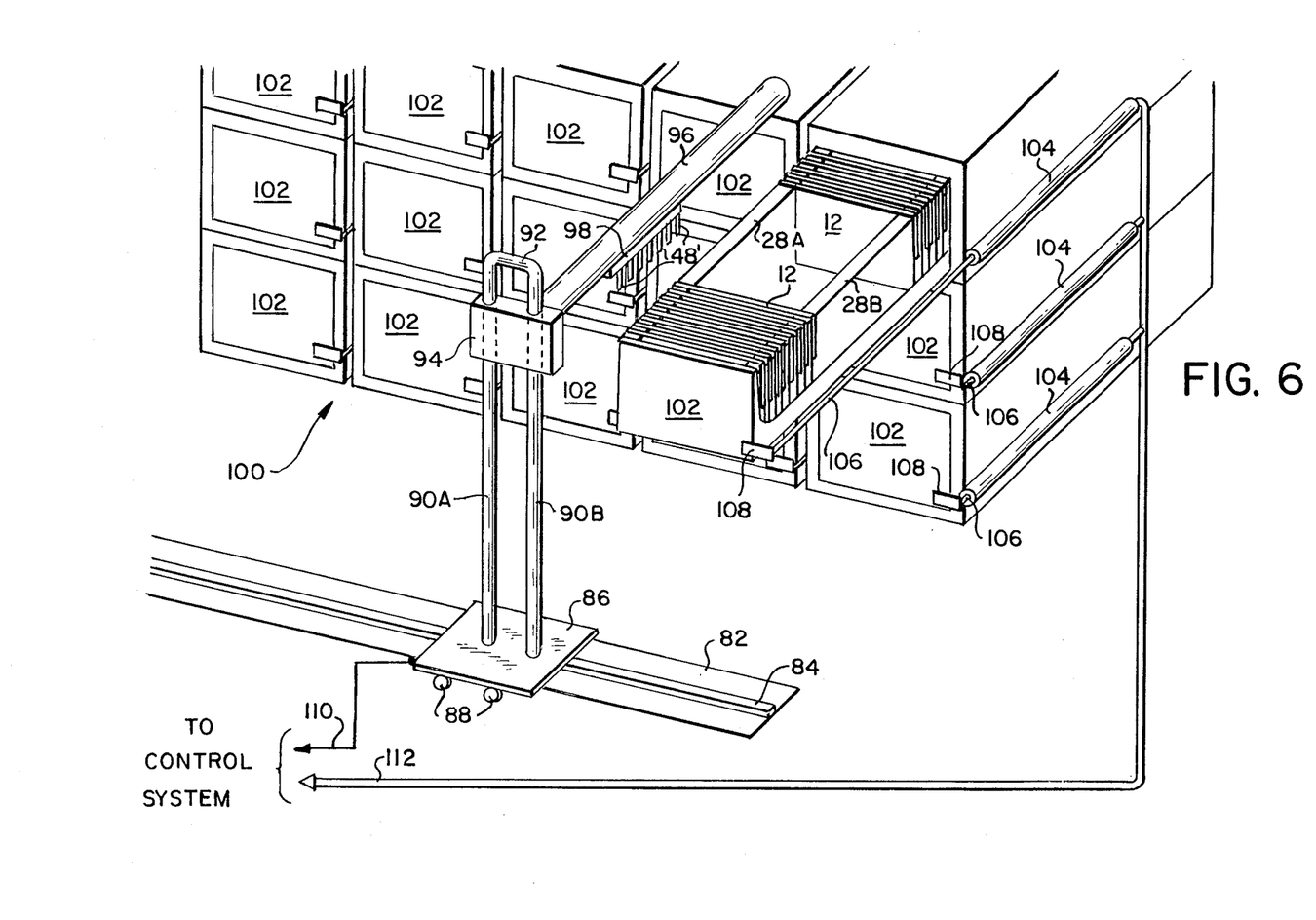
FIG. 6 is a perspective view of an additional embodiment of an article storage system according to the invention.

FIG. 6 illustrates a larger storage and inventory control system according to the invention. A frame 82 contains a track 84 along which a base 86 moves. Base 86 may have affixed thereto wheels 88 for contacting the portions of the frame 82 or a surface such as a floor, upon which frame 82 is mounted, to assure stability. It will be understood that with some designs, the frame 82 may simply be a portion of the floor upon which the system of FIG. 6 is mounted. Two parallel vertical posts 90A and 90B extend upwardly from base 86 and are joined together at their tops by a cross member 92.

Posts 90A and 90B have machined therein or attached thereto tracks (not shown) which engage a drive mechanism (not shown) in a box-like structure 94 so that structure 94 can be caused to move up and down along posts 90A and 90B. A horizontal extension 96 of structure 94 supports a carrier 98 which is caused to move toward and away from structure 94 by a drive means (not shown) therein. A plurality of attachment mechanisms 48' extend downwardly from carrier 98. Preferably there are ten mechanisms 48' and ten article containers 12 may be engaged at one time and the weight of each one separately determined by a separate weighing transducer associated with each of mechanisms 48'.

A file cabinet system 100 of file cabinet drawers 102 is placed adjacent frame 82 and parallel thereto. An actuator 104 for each drawer 102, such as a pneumatic or hydraulic cylinder 104, has a piston (not shown) therein attached to a piston rod 106. Rod 106 has affixed thereto an attachment flange 108 which is secured to a portion of drawer 102, so that motion of piston rod 106 causes drawer 102 to move forward out of file cabinet system 100, thus exposing the tops of article containers 12 supported between longitudinal members 28A and 28B of frame 10 so that ten containers 12 can be weighed at one time by lifting mechanisms 48'. After a first group of ten have been weighed, carrier 98 is moved along horizontal extension 96 to a position where a second group of ten containers is weighed. This process is repeated until all containers 12 in a drawer 102 have been weighed, and any information on strips 62 affixed thereto obtained by decoding devices 64 associated with each lifting mechanism 48'.

After all containers 12 in a drawer 102 have been weighed, air or fluid is withdrawn from cylinder 104, closing that drawer 102. Another drawer 102 is extended by action of its respective cylinder 104, and horizontal extension 96 is properly positioned over it by motion of structure 94 along posts 90A and 90B and/or motion of base 86 along track 84. Carrier 98 and lifting mechanisms 48' then move so as to weigh, in groups of ten, all containers in the second drawer. The procedure is repeated until all of the containers 12 in all drawers 102 have been weighed. The apparatus of FIG. 6 is connected to control system similar to that of FIG. 1, so that a computer can direct motion of base 86, structure 94, carrier 98, lifting mechanisms 48', and drawers 102 (by means of cylinders 104 and a vacuum and compressed air source). In addition the computer acquires data from weighing transducers and decoding devices associated with lifting mechanisms 48' and processes that data to provide information concerning the number of articles stored in each of containers 12, or other inventory control and maintenance information useful to the manager, as discussed above. Appropriate connections to the control system are provided by electrical control lines in a cable 110 and pneumatic or hydraulic control lines in a cable 112.

Although shown and described in what are believed to be the most practical and preferred embodiments, it is apparent that departures from the specific designs described and shown will suggest themselves to those skilled in the art and may be made without departing from the spirit and scope of the invention. I, therefore, do not wish to restrict myself to the particular construction described and illustrated, but desire to avail myself

I claim:

1. Apparatus for article storage, retrieval and inventory, comprising:
a frame having two parallelly spaced horizontally disposed frame members;
a plurality of article storage means, each having support means affixed thereto for freely and independently suspending each said article storage means from said frame members, said article storage means being flexible and free to expand to accommodate articles of varied and irregular shapes therein; and
combined means for the attachment, lifting and weighing of each of said article storage means individually.

2. The storage system apparatus of claim 1, wherein said frame members each have recesses for receiving said support means.

3. The storage system apparatus of claim 2, wherein said recesses are regularly spaced along each of said frame members.

4. The storage system apparatus of claim 1, wherein each of said article storage means is formed of one of a transparent and a non-transparent material.

5. The storage system apparatus of claim 1, wherein each said article storage means is a pouch-like container, said container having an opening for receiving said articles only at its top.

6. The storage system apparatus of claim 1, wherein each of said plurality of article storage means has a dimension different from that of the article storage means immediately adjacent thereto in a direction extending away from said frame members when said plurality of article storage means are supported on said frame members by said support means.

7. The storage system apparatus of claim 1, wherein said frame is constructed so as to permit viewing of said article storage means in a direction parallel to a plane defined by said frame members.

8. The storage system apparatus of claim 1, in combination with a file cabinet drawer, said file cabinet drawer being configured to receive said frame.

9. The storage system apparatus of claim 8, wherein said file cabinet drawer has sides constructed so that said article storage means may be viewed in a direction parallel to a plane defined by said frame members.

10. The storage system apparatus of claim 1, wherein said combined means for attachment, lifting and weighing comprises:
a lifting means disposed adjacent said members of said frame;
at least one attachment means coupled to said lifting means, each said attachment means being for engaging a part of each said plurality of article storage means; and
at least one weighing means associated with each said at least one attachment means for weighing each of said plurality of article storage means, said at least one weighing means being for determining the gross weight of each of said article storage means, whereby the combination of said lifting means, said at least one attachment means and said at least one weighing means makes possible lifting and instant individually separate weighing of each of said plurality of article storage means.

11. The storage system apparatus of claim 10, wherein said weighing means further comprises:
calculating means for determining a number of articles stored in each said article storage means weighed by said weighing means, when articles stored in one article storage means are all of one given weight.

12. The storage system apparatus of claim 11, wherein said calculating means comprises:
storage means for storing values corresponding to net weight of each article storage means and weight of one of said articles stored therein; and
arithmetic means for subtracting from said gross weight of each said article storage means said net weight to determine the aggregate weight of articles stored in each article storage means and for dividing the aggregate weight by said weight of one of said articles stored therein to determine the number of articles stored in said article storage means.

13. The storage system apparatus of claim 10, wherein each said article storage means further comprises an information coding means for storing information concerning at least the nature of said articles stored in said article storage means, said storage system further comprising decoding means coupled to said lifting means, said decoding means being for decoding said information.

14. The storage system apparatus of claim 13, further comprising information processing means for processing said information to determine the number of articles stored in each said article storage means weighed by said weighing means.

15. The storage system apparatus of claim 13, wherein said information coding means is a magnetic strip and said decoding means is a coil which is moved in close proximity to said magnetic strip when said lifting means is moved by said motive means.

16. The storage system apparatus of claim 13, wherein said coding means is an optical bar pattern and said decoding means includes a light source of selected frequency for illuminating successive portions of said optical bar pattern and a detector for detecting light of said selected frequency reflected by said successive portions of said optical bar pattern.

17. The storage system apparatus of claim 10, wherein each said article storage means further comprises an external region having ink retaining properties, whereby said article storage region can be marked with information concerning the nature of the articles stored therein.

18. The storage system apparatus of claim 17, wherein said external region on successive article storage means are staggered in location between said spaced apart frame members.

19. The storage system of claim 10, wherein said article storage means each include a magnetic region; and said attachment means each include an electromagnet means actuable at selected times and positioned for attracting said magnetic region, whereby motion of said lifting means caused by said motive means at said selected times causes said article storage means to be lifted.

20. The storage system apparatus of claim 11, wherein said article storage means each include a substantially flat and smooth suction region; and said attachment means each include a suction means for engaging said suction region at selected times, whereby motion of said lifting means caused by said motive means at said selected times causes said article storage means to be lifted.

21. The storage system apparatus of claim 10, wherein said article storage means each have at least one opening along an edge thereof; and said lifting means each have a lifting member for being received in said opening, said lifting member being configured to engage said opening and to lift said article storage means when said lifting means is moved along a predetermined path, by said motive means.

22. The apparatus for article storage and retrieval of claim 1, further comprising:
a plurality of storage drawers arranged in proximity to one another, each of said storage drawers having one said frame fittingly disposed in each one of said plurality of storage drawers;
said plurality of article storage means being distributed in multiples in said storage drawers; and
actuating means for selectively causing each of said storage drawers to be extended rom its respective position in the direction of length thereof, to permit the operation of said combined means for attachment, lifting and weighing.

23. The storage system apparatus of claim 22, wherein plurality of drawers are arranged in a regular geometric pattern.

24. The storage system apparatus of claim 22, wherein said plurality of drawers are arranged in rows and columns.

25. The storage system apparatus of claim 22, further comprising:
a second frame extending so as to have a portion thereof aligned with each of said plurality of drawers when said drawer is extended by said actuating means;
a track affixed to said second frame, said track extending to each of said frame extension portions;
said combined attaching lifting and weighing means comprising a lifting means coupled to said second frame and and movable on said track, at least one attachment means coupled to said lifting means, each said attachment means being for engaging said support means of each said article storage means;
motive means for moving said lifting means along said track so that each of said at least one attachment means is positioned to engage said support means of each said article storage means; and
directing means for directing said motive means to move said lifting means along said track to positions adjacent each of said plurality of storage drawers when said drawers have been extended, and for causing said lifting means to be moved so that at least one attachment means can engage each of said plurality of article storage means and lift each of said plurality of article storage means individually to be supported only by said at least one attachment means.

26. The article storage apparatus of claim 25, further comprising a weighing means associated with each of said at least one attachment means, each said weighing means being for determining the gross weight of one of said plurality of article storage means, making possible the joint lifting and instant individually separate weighing of said plurality of article storage means.

27. The storage system apparatus of claim 26, wherein said weighing means further comprises:
calculating means for determining the number of articles stored in each said article storage means weighed by said weighing means, when articles stored in any one article storage means are all of one given weight.

28. The storage system apparatus of claim 25, wherein said directing means is a computer.

29. The storage system apparatus of claim 25, wherein each said article storage means further comprises an information coding means for storing information concerning at least the nature of said articles stored in said article storage means, said storage system further comprising decoding means coupled to said lifting means, said decoding means being for decoding said information.

30. The storage system apparatus of claim 29, further comprising information processing means for processing said information to determine the number of articles stored in each said article storage means weighed by said weighing means.

31. The storage system apparatus of claim 22, wherein each of said plurality of article storage means is of a different length from each said plurality of article storage means adjacent thereto, in a direction extending perpendicularly from a plane defined by said frame members.

* * * * *